United States Patent
Matsuzawa et al.

(10) Patent No.: US 9,229,860 B2
(45) Date of Patent: Jan. 5, 2016

(54) STORAGE SYSTEM

(71) Applicant: Hitachi, Ltd., Tokyo (JP)

(72) Inventors: Keiichi Matsuzawa, Tokyo (JP); Hitoshi Kamei, Tokyo (JP); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/423,921

(22) PCT Filed: Mar. 26, 2014

(86) PCT No.: PCT/JP2014/058656
§ 371 (c)(1),
(2) Date: Feb. 25, 2015

(87) PCT Pub. No.: WO2015/145636
PCT Pub. Date: Oct. 1, 2015

(65) Prior Publication Data
US 2015/0331793 A1 Nov. 19, 2015

(51) Int. Cl.
*G06F 12/00* (2006.01)
*G06F 12/06* (2006.01)
(Continued)

(52) U.S. Cl.
CPC .......... *G06F 12/0646* (2013.01); *G06F 3/0617* (2013.01); *G06F 3/0644* (2013.01); *G06F 3/0673* (2013.01); *G06F 12/0292* (2013.01); *G06F 17/30082* (2013.01);
(Continued)

(58) Field of Classification Search
CPC .......... G06F 12/0646; G06F 17/30233; G06F 17/30082; G06F 12/0292; G06F 3/0644; G06F 3/0673; G06F 17/30138; G06F 3/0617; G06F 2212/152; G06F 2212/657; G06F 2212/1044
See application file for complete search history.

(56) References Cited

U.S. PATENT DOCUMENTS

| 5,574,952 A | 11/1996 | Brady et al. |
| 2002/0073294 A1* | 6/2002 | Beaven ............... G06F 11/1471 711/171 |

(Continued)

FOREIGN PATENT DOCUMENTS

| JP | 08-050537 | 2/1996 |
| JP | 2003-015915 A | 1/2003 |

(Continued)

OTHER PUBLICATIONS

PCT Written Opinion of the International Searching Authority on application PCT/JP2014/058656 mailed Jul. 8, 2014; 3 pages.

(Continued)

*Primary Examiner* — John Lane
(74) *Attorney, Agent, or Firm* — Foley & Lardner LLP

(57) ABSTRACT

In the present invention, when configuration data art a LFS (Log-Structured File system) is stored on a virtual volume constructed from a plurality of Storage mediums, a temporal change of the file size on the file system is roughly estimated. Then, in accordance with the change, a capacity that is needed on the virtual volume is provided, a cursor at the end of a log is set, and a write cursor for writing data is set so as to avoid the position behind the cursor at the end of the log. Accordingly, it is possible to, when the LFS occupies only a small area on the virtual volume, avoid early execution of the allocation of an available capacity, and thus avoid a circumstance in which a large number of storage mediums are needed at an early stage of the operation of the virtual volume (see FIG. 1).

15 Claims, 14 Drawing Sheets

(51) Int. Cl.
*G06F 3/06* (2006.01)
*G06F 12/02* (2006.01)
*G06F 17/30* (2006.01)

(52) U.S. Cl.
CPC ... *G06F 17/30138* (2013.01); *G06F 17/30233* (2013.01); *G06F 2212/1044* (2013.01); *G06F 2212/152* (2013.01); *G06F 2212/657* (2013.01)

(56) References Cited

U.S. PATENT DOCUMENTS

| | | |
|---|---|---|
| 2003/0009619 A1 | 1/2003 | Kano et al. |
| 2003/0145167 A1 | 7/2003 | Tomita |
| 2007/0192516 A1* | 8/2007 | Ibrahim ............. G06F 13/4054 |
| | | 710/22 |
| 2012/0023305 A1 | 1/2012 | Satoyama et al. |
| 2015/0154225 A1* | 6/2015 | Fauser ............. G06F 17/30286 |
| | | 707/610 |

FOREIGN PATENT DOCUMENTS

| | | |
|---|---|---|
| JP | 2003-223284 A | 8/2003 |
| WO | WO 2011/135635 A1 | 11/2011 |

OTHER PUBLICATIONS

Rosenblum, Mendel, et al.; The Design and Implementation of a Log-Structured File System; Jul. 24, 1991; pp. 1-15; ACM Transactions on Computer Systems, vol. 10 Issue 1, 1992.

PCT International Search Report on application PCT/JP2014/058656 mailed Jul. 8, 2014; 1 page.

* cited by examiner

Fig. 6

| Volume ID | Chunk Offset | Number of Chunks | Storage Medium ID | Storage Medium Offset |
|---|---|---|---|---|
| 1 | 0 | 80 | 1 | 50 |
| 1 | 80 | 30 | 3 | 10 |
| 1 | 110 | 40 | 2 | 30 |
| 2 | 0 | 50 | 1 | 0 |
| 2 | 50 | 100 | - | - | ial
STORAGE SYSTEM

TECHNICAL FIELD

The present invention relates to a storage system, and for example, relates to a storage system having a virtual volume to which a capacity is allocated from a physical storage medium(s).

BACKGROUND ART

In computers that handle a large volume of data, data input/output performance has a significant influence on the time required to complete data processing.

With respect to data writing to a storage device, such as a hard disk, in a computer, the performance of writing data to a small number of continuous large areas is typically higher than the performance of writing data to a large number of small areas. For example, when data is input to or output from each area of a hard disk drive or an optical disc, a storage medium should be rotated up to the position of the header. Thus, it takes time to wait for the completion of the rotation. Therefore, writing data to a large number of small areas requires a larger number of times to wait for the completion of the rotation, which results in an increased total input/output time. Even on a medium that includes no physically driven components, such as flash memory, inputting and outputting data to/from a large number of small areas requires more pieces of management information for the input/output, and thus takes more time than inputting and outputting data to/from a small number of large areas.

A file system typically stores a large number of directories and files whose information are related to one another. Therefore, when some file is changed, directory information and metadata related to the file should also be changed. In a typical file system, such related information is stored at a distant location on a storage medium. Therefore, when data is updated, it is necessary to input and output data to/from a large number of small areas. Thus, high performance is difficult to maintain.

In order to solve such inconvenience, a file system called LFS (Log-Structured File system) has been proposed (see Non Patent Literature 1), and a file system that is based on the idea of LFS has been put into practical use. A LFS can restrict data input/output to occur in a small number of large areas on a storage medium by writing update information on the file system to the storage medium in a log-like manner. Meanwhile, since post-update data is stored at a different position from the data storage position of pre-update data, the data region for the pre-update data becomes unnecessary and thus will not be referenced.

As a method for managing the capacities of storage mediums, there is known a method called "thin-provisioning" that divides a plurality of storage mediums as a set of fixed-length or variable-length chunks, and combines such chunks to provide a virtual capacity (i.e., virtual volume) (see Patent Literature 1). In this method, association with a chunk of a storage medium (i.e., allocation of an available capacity) is delayed until when an input/output request is issued to each area on a virtual volume, whereby a virtual volume with a higher capacity than the total capacity of the actual storage mediums can be constructed. Accordingly, it is possible to perform an operation of starting a computer system with a small number of storage mediums and adding a storage medium(s) thereto at a later date.

CITATION LIST

Patent Literature

Patent Literature 1: United States Patent No. 2003/009619 A

Non Patent Literature

Non Patent Literature 1: Mendel Rosenblum and John K. Ousterhout. The design and implementation of a log-structured file system. ACM Transactions on Computer Systems, Vol. 10 issue 1. pp26-52, 1992.

SUMMARY OF INVENTION

Technical Problem

However, when configuration data on a LFS is stored in a virtual volume, the LFS will write update data on the file system to the virtual volume due to its nature (see FIG. 5). Therefore, when an identical file is updated a plurality of times, data input/output are performed on different areas of the virtual volume the same number of times as the update. Consequently, as the data input/output are performed on many areas on the virtual volume, corresponding to the data capacity of files stored on the file system, there is a problem in that a process of associating all areas of the virtual volume with chunks is executed early, and thus that the capacities of the storage mediums are used up early.

The present invention has been made in view of the foregoing, and provides a technique for preventing data from being input to or output from a wide range of areas on a virtual volume by a write file system like a LFS, and thus preventing early execution of the allocation of an available capacity to the virtual volume.

Solution to Problem

In order to solve the above problem, the storage system of the present invention executes a process of continuously writing update data to an unused area in a virtual volume at a position behind a write cursor, and changing an area, in which pre-update data has been stored, at a position preceding the write cursor into an unused area. At this time, the storage system controls a size of a capacity allocated to the virtual volume from the storage medium based on a capacity that is necessary to write the update data, a capacity of the unused area at the position preceding the write cursor, and a capacity of the unused area at the position behind the write cursor. For example, the storage system calculates, for a virtual volume in which the aforementioned writing method is executed, a capacity of the virtual volume that is required to provide a necessary capacity and performance based on a temporal transition of a capacity that is occupied by an actually referable area of the stored data and an available capacity of the physical storage medium of the system, and restricts an area to which the update data is written (i.e., the position of the end of the log on the virtual volume) to be within the capacity of the virtual volume.

Further features related to the present invention will become apparent from the description of the specification and the accompanying drawings. In addition, embodiments of the present invention can be implemented by elements, a combination of a variety of elements, the following detailed description, and the appended claims.

Advantageous Effects of Invention

According to the present invention, it is possible to prevent early execution of the allocation of an available capacity to a virtual volume, and thus eliminate the need to use a large number of storage mediums at an early stage of operation.

BRIEF DESCRIPTION OF DRAWINGS

FIG. 6 is a diagram showing an exemplary structure of a volume management table in accordance with an embodiment of the present invention.

DESCRIPTION OF EMBODIMENTS

Figure 1:
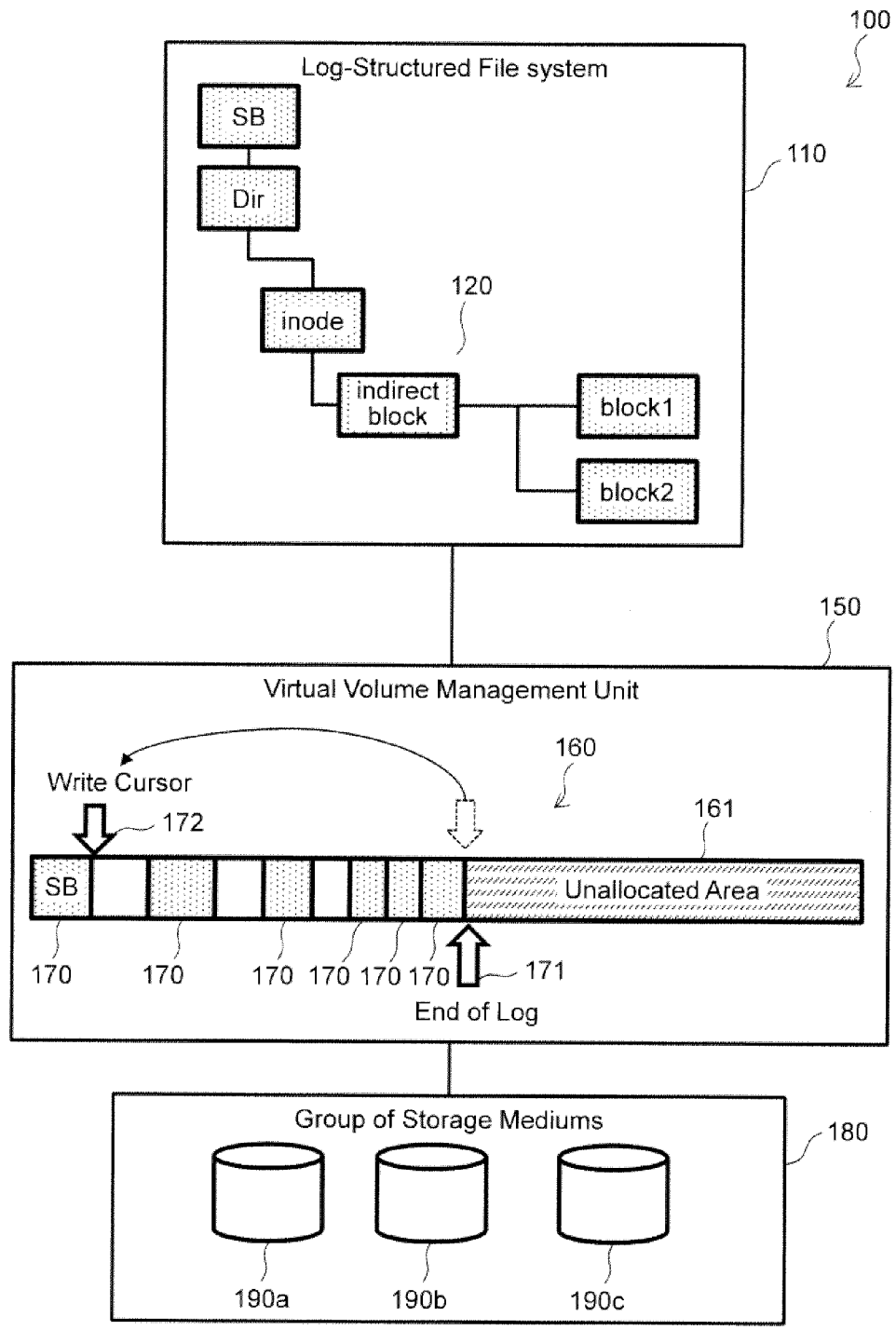
FIG. 1 is a schematic diagram of a process in an embodiment of the present invention.

Hereinafter, embodiments of the present invention will be described with reference to the accompanying drawings. In the accompanying drawings, elements that have the same function may be denoted by the same reference numeral. Although the accompanying drawings show specific embodiments and exemplary implementations in accordance with the principle of the present invention, they are illustrative only for understanding of the present invention, and should never be used to narrowly construe the present invention.

Although this embodiment contains fully detailed descriptions for one of ordinary skill in the art to carry out the present invention, it should be appreciated that other implementations and embodiments are also possible and thus that any changes to the configurations or structures as well as replacement of a variety of elements are possible within the spirit and scope of the present invention. Thus, the present invention should not be limited to the following description.

Further, embodiments of the present invention may be implemented on any of software that runs on a general-purpose computer, dedicated hardware, or a combination of software and hardware.

In the following description, a "table" form is used to describe each information of the present invention. However, such information need not necessarily be represented by a data structure in a table form. For example, such information may be represented by a data structure of a list, DB, queue, or the like. Therefore, a "table," "list," "DB," "queue," and the like may also be simply referred to as "information" to show that such information does not depend on the data structure.

In addition, representations such as "identification information," "identifier," "name," "appellation" and "ID" may also be used to describe the content of each information, and such representations are interchangeable.

In the following description, each process in an embodiment of the present invention will be described as being performed by a "program" as a subject (i.e., a subject that performs an operation). However, as a program performs a predetermined process using memory and a communication port (i.e., communication control device) by being executed by a processor, description may also be made on the assumption that a process is performed by a processor as a subject. Further, a process that is disclosed as being performed by a program as a subject may also be a process that is executed by a computer, such as a management server, or an information processing device. Some or all of programs may be implemented by dedicated hardware, or implemented as a module. A variety of programs may be installed on each computer by a program distribution server or a storage medium.

(1) First Embodiment

<Summary of Process of the Present Invention>

FIG. 1 is a diagram illustrating a summary of data management in an embodiment of the present invention. In the data management, a virtual volume management unit 150 constructs a virtual volume 160 with a thin-provisioning function from a group 180 of storage mediums including a plurality of storage mediums 190. A LFS (Log-Structured File system) 110 writes a logical data structure 120, which constitutes the file system, to the virtual volume 160 as on-disk data 170. When the logical data structure 120 is changed by data writing, data update, or the like, information on the change is written to the virtual volume 160 at a position indicated by a write cursor 172. The LFS 110 manages a cursor 171 at the end of the log. When the write cursor 172 has reached the cursor 171 at the end of the log, the LFS 110 determines whether to move the cursor 171 at the end of the log based on the file size in the file system or the like to prevent the write cursor 172 from unnecessarily pointing the entire area of the virtual volume 160, that is, to prevent the write cursor 172 from unnecessarily pointing an unallocated area of the virtual volume as the write position. In the determination, if the LFS 110 determines not to move the cursor 171 at the end of the log, the write cursor 172 moves to the head position on the virtual volume 160 so that data writing to areas other than the area in which the on-disk data 170 is already written is repeated from the head position again. When the LFS 110 avoids writing data to an unallocated area 161 at a position behind the cursor 171 at the end of the log, it is possible to prevent data from being written to all areas of the virtual volume 160 early and thus prevent early execution of the allocation of an available capacity, Hereinafter, components that implement the configuration of data management in FIG. 1 will be described.

It should be noted that a LFS is suitable for a file server for an office where small-size data is frequently updated, and thin-provisioning is suitable for a case where the capacity being used gradually increases. Therefore, use cases of the present invention include a file server for an office in which data is frequently updated and the capacity increases with the passage of time.

<Configuration of File Storage Device>

Figure 2:
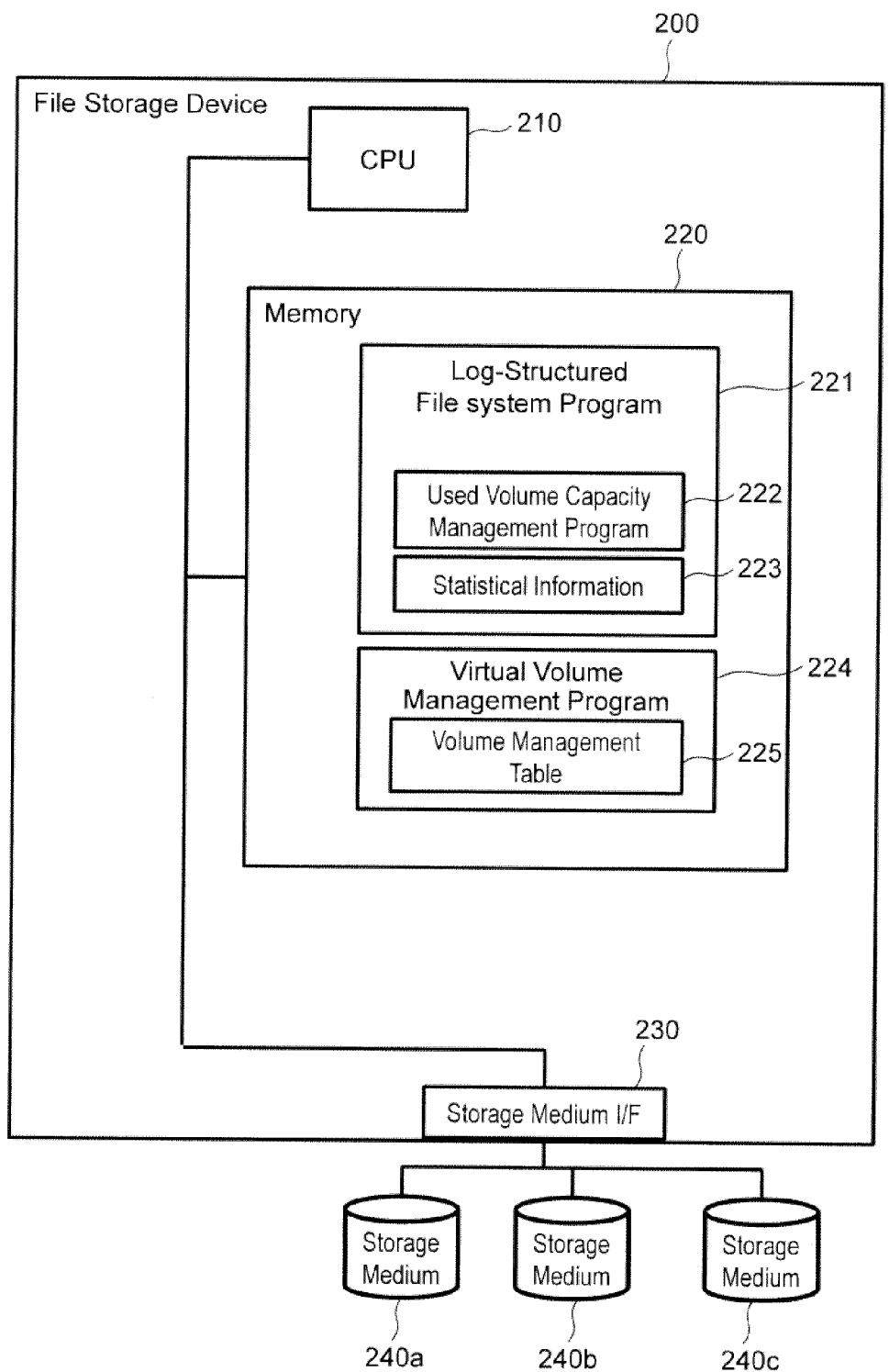
FIG. 2 is a configuration diagram of a file storage device (i.e., storage system) in accordance with a first embodiment of the present invention.

FIG. 2 is a schematic configuration diagram of a file storage device 200 in accordance with a first embodiment of the present invention. The file storage device (also referred to as a file server) 200 includes a CPU (Central Processing Unit) 210, memory 220, and a storage medium interface 230.

The CPU 210 reads a variety of programs in the memory 220, and controls the components of the file storage device 200 in accordance with instructions of the programs.

The memory 220 stores a LFS (Log-Structured File system) program 221 and a virtual volume management program 224. The LFS program 221 is a program that provides a basic function of the file system, such as files and directories. The LFS program 221 stores a used volume capacity management program 222 statistical information 223.

The virtual volume management program 224 is a program that constructs one or more virtual volumes from a storage medium(s) 240. The virtual volume management program 224 stores a volume management table 225. The LFS program 221 stores information, which constitutes a single file system, into a single virtual volume. Therefore, using a plurality of virtual volumes can provide a plurality of file systems on the single file storage device 200.

The file storage device 200 inputs or receives data to/from the storage medium(s) 240 via the storage medium interface 230. Each storage medium 240 is a device that stores data, and corresponds to an optical disc, a magnetic disk, a magnetic tape, nonvolatile memory, a flash storage, or the like. As a communication method for inputting and receiving data to/from the storage medium(s) 240 via the storage medium interface 230, ATA (AT Attachment interface), SATA (Serial ATA), SCSI (Small Computer System Interface), SAS (Serial Attached SCSI), or the like is used.

Figure 3:
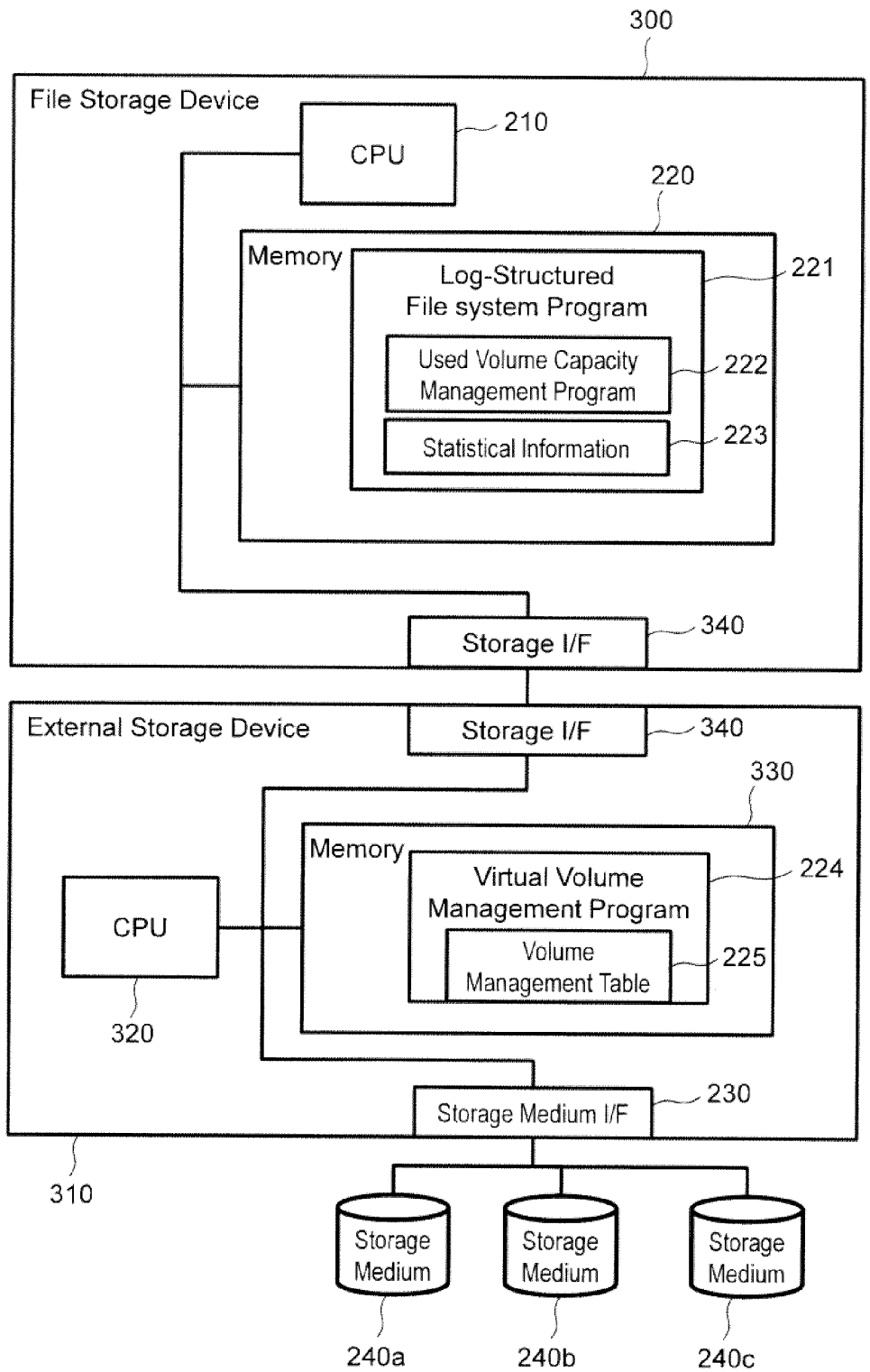
FIG. 3 is a configuration diagram of a storage system in accordance with another embodiment of the present invention.

FIG. 3 is a schematic configuration diagram of a file storage device 300 in accordance with a variation of the first embodiment of the present invention. In the exemplary configuration, the file storage device 300 and an external storage device 310 are connected via a storage interface 340. The file storage device 300 is obtained by removing the virtual volume management program 224 and the storage medium interface 230 from the file storage device 200, and instead, providing the external storage device 310 with the virtual volume management program 224 and the storage medium interface 230, and thus providing an independent virtual volume management function as another device. The external storage device 310 is referred to as an external-controller based storage or the like. The external storage device 310 includes a CPU 320, memory 330, and the storage medium interface 230. The CPU 320 reads a variety of programs in the memory 330, and controls the components of the external storage device 310 in accordance with instructions of the programs. The virtual volume management program 224 and the storage medium interface 230 in the external storage device 310 and the storage medium(s) 240 are the same as those in the file storage device 200.

The storage interface 340 that connects the file storage device 300 and the external storage device 310 is a path for transferring input/output requests and data from the file storage device 300 to the virtual volumes provided by the external storage device 310, and corresponds to a host bus adapter or the like. As an example of a protocol for the communication conducted via the storage interface 340, Fibre Channel, iSCSI (Internet Small Computer System Interface), or the like is used.

<Logical Data Structure of LFS>

Figure 4:
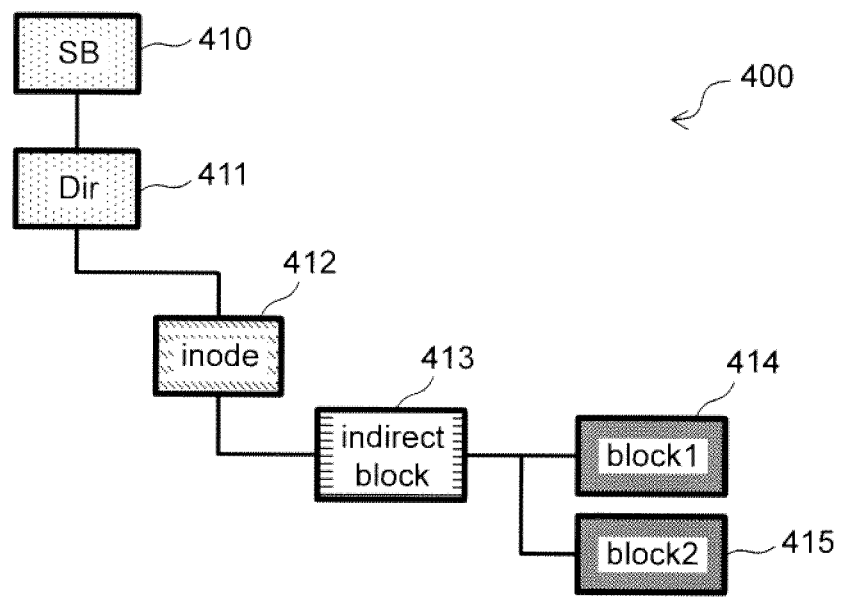
FIG. 4 is a diagram showing a data management scheme of a LFS (Log-Structured File system).

FIG. 4 is a diagram showing a logical data structure 400 managed by the LFS program 221. A file system typically manages information on a large number of files and directories. The logical data structure 400 shows a data structure related to one of such files. The logical data structure 400 includes a super block 410, a root directory 411, an inode 412, an indirect block 413, and at least one of blocks 1 to 2: 414 to 415.

The super block 410 is a single piece of data provided in the logical data structure 400 (or a plurality of pieces of data when applied to a snapshot described below). The super block 410 holds data indicating information on the entire file system, specifically, the size of the file system, total data volume, the number of files, the position of the write cursor, the end position of the log, and the like. The super block 410 also stores the position of the root directory 411.

The directory entry 411 stores information on other directories or files that are stored in the directory entry 411. Examples of information that are stored in the directory entry 411 include the names of directories and files and the position of the inode 412. Although FIG. 4 shows only one directory entry 411, it is generally possible to form a tree structure by constructing a hierarchical directory structure for a file system and allowing a directory to contain other directories therein. In such a case, multiple hierarchical levels of the directory entry 411 are stored. The topmost directory entry of the tree structure is referred to as a root directory, and is referenced from the super block 410.

The inode 412 stores information on the individual files. Information contained in the inode 412 include a file size, file type, access authority, and the like as well as the indirect block 413 representing a list of the data storage positions of files. The indirect block 413 stores the positions of the blocks 414 and 415 that are the actual file data. The indirect block 413 and the blocks 1 to 2: 414 to 415 correspond to data on a single file.

<Operation when Virtual Volume is Applied to Typical LFS>

Figure 5:
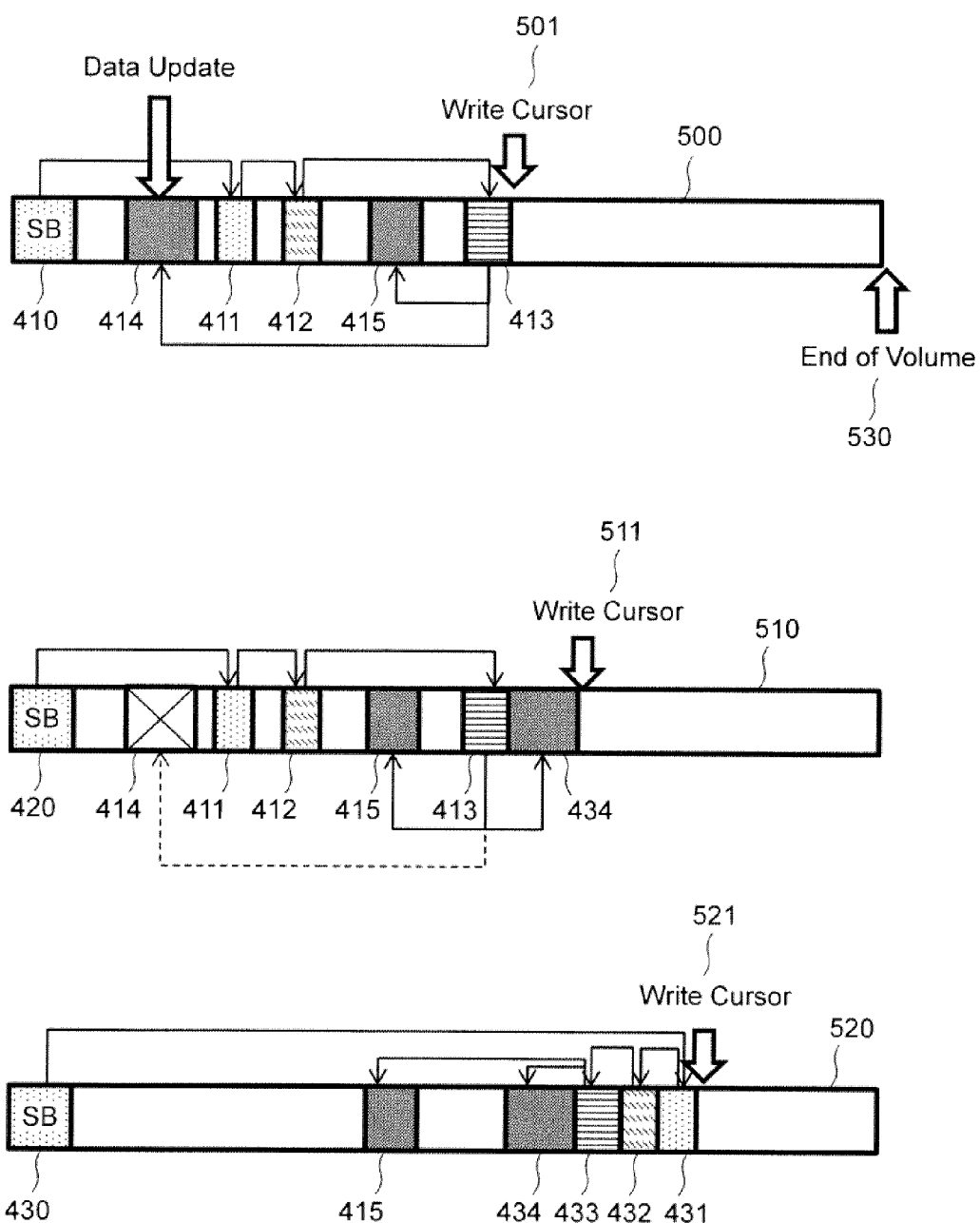
FIG. 5 is a diagram showing an update data writing scheme of a typical LFS.

FIG. 5 is a diagram showing the arrangement of the logical data on the LFS on a virtual volume. This will be referred to as an on-disk data structure corresponding to the logical data structure.

The virtual volume 500 before the data update is a data storage area constructed from the storage medium 240. A virtual volume can be regarded as a one-dimensional data array. Data can be input to and output from the virtual volume by identifying the position on the virtual volume using a LBA (Logical Block Address). An on-disk data structure 501 has constituent elements 410, 411, 412, 413, 414, and 415 (which correspond to the constituent elements in FIG. 4) of the logical data structure 400 that are arranged on the virtual volume 500. The storage positions of the constituent elements 411, 412, 413, 414, and 415 on the virtual volume 500 are held in the upper-level elements of the tree structure shown by the logical data structure 400. Accordingly, the position of each element can be identified by sequentially searching for the storage position from the super block 410. In addition, in the LFS, the positional information on the write cursor 501 with respect to the virtual volume 500 is also held in the super block 410. Such write cursor 501 holds a LBA in which data was last written by the LFS program 221. It should be noted that the positional information on the write cursor 501 is written over and stored in the super block 410.

When changing the constituent elements of the logical data structure 400, the LFS program 221 writes update information onto the virtual volume 500 in accordance with the following procedures. When information on the block 414 is changed, the virtual volume 510 during the update process shows the intermediate state of the update process executed by the LFS program 221. When changing information on the block 414, the LFS program 221 does not write the changed information over the block 414 in the virtual volume 500, but writes the information as a new post-update block 434 at a position behind the write cursor 501 in the virtual volume. After that, the write cursor 501 moves to a LBA that is behind the current position by the size of the post-update block 434, and becomes a cursor 511 in the update process. When the post-update block 434 is written onto the virtual volume 500, the pre-update block 414 becomes unnecessary. Thus, it becomes possible for the LFS program 221 to manage an area, which has been used by the block 414 on the virtual volume, as an unused area, and thus write different data to such area in the subsequent update process.

As the post-update block 434 and the storage position on the virtual block are changed, in order for the block 414 to reference the post-update block 434, it is necessary for the indirect block 413, which is the reference source, to store the location of the post-update block 434. Therefore, the indirect block 413 is similarly changed and is stored as a post-change indirect block 433 in the area behind the write cursor 511 during the update process. Likewise, when the constituent element of a given data structure is updated, a parent element that references the element is also updated, and all pieces of such information are stored in succession at positions behind the pre-update write cursor 501. A volume 520 after the completion of the update process and a write cursor 521 after the completion of the update process show examples after all of parent elements are updated. It should be noted that a super block 430 after the update process is arranged at the head of the virtual volume as with the pre-update super block 410.

When the write cursor 501 has arrived at the position of the end 530 of the volume, which indicates the maximum LBA held in the virtual volume, during the process, the write cursor 501 returns to the minimum LBA in the unused area. Meanwhile, when another data structure is written at the position of the write cursor, the write cursor moves to the minimum LBA, which indicates an unused area, among the LBAs that are larger than the current LBA.

Through such operations, in the LFS, an updated related data structure is basically stored in a single continuous area, and is stored in non-continuous areas only when the write cursor 501 has arrived at the end 530 of the volume or another data structure.

It should be noted that the logical data structure and the on-disk data structure of the LFS are not limited to the forms of the logical data structure 400 and the virtual volume 500, respectively. For example, as the data structure, it is also possible to use the structures of other typical file systems, for example, by holding additional information, such as extended attributes and access authority of the inode, or store extent instead of the indirect block. In addition, although the super block 410 is arranged at the head of the virtual volume 500, the position may be moved. The subsequent process can be applied as long as a data structure is used in which, in response to a plurality of updates to the data structure, post-update data is written to a series of continuous areas, and pre-update data structure is provided as an unused area. Although the subsequent process is described with respect to the data structure of a file system like the data structure 400, the present invention can be applied not only to as LFS but to any data structure in which logical data structures on a virtual volume have reference relationships with one another, and related data structures are continuously written onto the virtual volume in response to update (i.e., a data structure in which data writing due to update propagates in a predetermined direction of the volume, or a data structure in which post-update data is not written over the storage position of the pre-update data but written at a position behind the write cursor).

<Volume Management Table>

FIG. 6 is a diagram showing an exemplary structure of the volume management table 225, which manages the relationship between the storage medium 240 and the virtual volume 500, held in the virtual volume management program 224. The virtual volume management program 224 handles each storage medium 240 and the virtual volume 500 as a set of fixed-length chunks, and stores the correspondence between each chunk on the virtual volume 500 and each chunk of the storage medium 240 in the volume management table 225. The volume management table 225 contains a volume ID 610, a chunk offset 620, the number of chunks 630, a storage medium ID 640, and a storage medium offset 650. In the volume management table 225, entries 670, 671, 672, 673, and 674 hold information representing the correspondence between the consecutive chunk groups on a given virtual volume 500 and the storage medium 240. It should be noted that the chunk size on the storage medium and the chunk size on the virtual volume are identical (e.g., a unit of 1 MB).

The volume ID 610 holds an ID that identifies a target virtual volume when there is a plurality of virtual volumes. The chunk offset 620 is information indicating the position of the head chunk of the entry in the virtual volume. Herein, the chunk number starts with zero. The number of chunks 630 is information indicating the number of chunks of the entry in the virtual volume. The storage medium ID 640 is information indicating the storage medium that constitutes the entry. The storage medium offset 650 is information indicating the position of the head chunk of the entry in storage medium. From the entry 670 in the volume management table, it is seen that a total of 80 chunks are assigned to the volume ID=1, with a storage medium ID=1 and a first chunk number of 50.

It should be noted that chunks that constitute a virtual volume need not necessarily be associated with a physical medium. For example, no physical medium ID 640 is described for a chunk on a virtual volume indicated by the entry 674 (indicated by "–"). An area on the virtual volume indicated by such an entry is not associated with a physical medium, and thus needs no capacity of a storage medium. Thus, such an area serves as an unallocated area. When an unallocated area is arranged in the virtual volume, it becomes possible to create a virtual volume with a higher capacity than that of a physical medium.

The virtual volume management program 224, when a data input/output request is issued to a virtual volume, inputs or receives data to/from a chunk of a physical medium corresponding to a chunk on the virtual volume that is the destination of the input/output request, with reference to the volume management table 225. Meanwhile, when a chunk on a virtual volume, which is the destination of an input/output request, is not associated with a chunk on a physical medium, the virtual volume management program 224 performs association with the chunk on the physical medium at a time point when the input/output request is received. Alternatively, the virtual volume management program 224 can change the correspondence between a chunk on a virtual volume and a chunk on a physical medium upon receiving a request from another computer or program.

<Control of End Position of Log>

Figure 7:
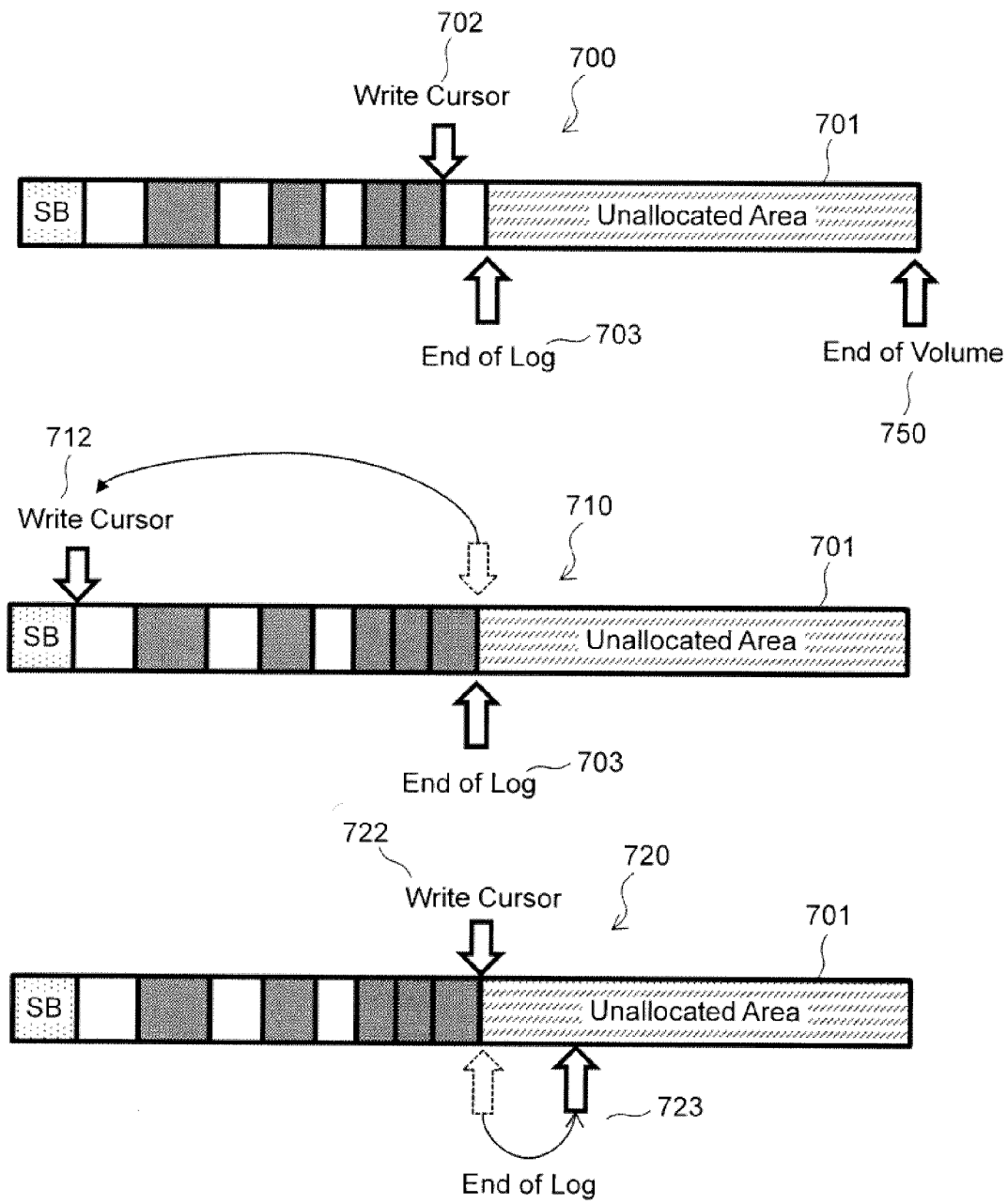
FIG. 7 is a diagram illustrating a summary of a process of determining whether to expand an area in accordance with the first embodiment of the present invention.

FIG. 7 is a diagram showing the operation related to the position control of a cursor 703 at the end of the log held by the LFS program 221. The position control of the end of the log in accordance with an embodiment of the present invention is adapted to increase the write operation speed, but cannot ensure a high-speed read operation as the write positions in each block are not continuous. However, when a defragmentation process is performed as described below, a high-speed read operation can also be ensured.

The LFS program 221 holds the positional information on the cursor 703 at the end of the log in the super block. The cursor 703 at the end of the log indicates the position of one of the head LBA of a virtual volume 700 to the end 750 of the volume. The LFS program 221. does not write data at LBAs at positions behind the cursor 703 at the end of the log on the virtual volume. Therefore, an area of and behind the cursor 703 at the end of the log is continuously an unallocated area 701.

Herein, as an operation example of when a write cursor 702 has arrived at the position of the end 703 of the log, suppose a virtual volume 710 as a case where an allocated area is maintained and a virtual volume 720 as a case where an unallocated area 701 is reduced and an allocated area is expanded. In the case of the virtual volume 710, the write cursor 702 moves to the position of a write cursor 712 indicating an unused area at the head of the virtual volume. In such a case, the cursor 703 at the end of the log need not be moved, and an area behind the cursor 703 at the end of the log is continuously an unallocated area 701. Meanwhile, in the case of the virtual volume 720, the cursor 703 at the end of the log moves to a LBA that is further behind the current LBA, and becomes a cursor 723 at the end of the log. In such a case, the write cursor 702 remains at the position of the cursor 703 at the end the log. The write cursor at this time is represented as a write cursor 722. At this time point, the size of the unallocated area 701 does not change, but when there is update to data later, new data is written to an area of up to the cursor 723 at the end of the log. At this time, an available capacity is allocated to the area of up to the cursor 723 at the end of the log. Thus, the capacity of the unallocated area 701 decreases, while the allocated area expands.

Maintaining and expanding the allocated area have both advantages and disadvantages. The advantage of maintaining the allocated area is that allocation of an available capacity is not necessary. Meanwhile, the disadvantage of maintaining the allocated area is that as the capacity of the unused area remains small, it takes a longer time for the write cursor to perform a process of searching for the unused area, and fragmentation of the unused area is likely to advance. Such disadvantage is improved by, for example, executing a defragmentation process during the night. In contrast, expanding the allocated area has advantages in that it is possible to suppress an increase in the processing time as the capacity of the unused area is expanded with the expansion of the allocated area, and fragmentation of the unused area is easily avoided. Meanwhile, expanding the allocated area also has disadvantages in that the capacity of a physical medium is needed to allocate an available capacity.

<Process of Determining Whether to Expand Allocated Area>

Figure 8:
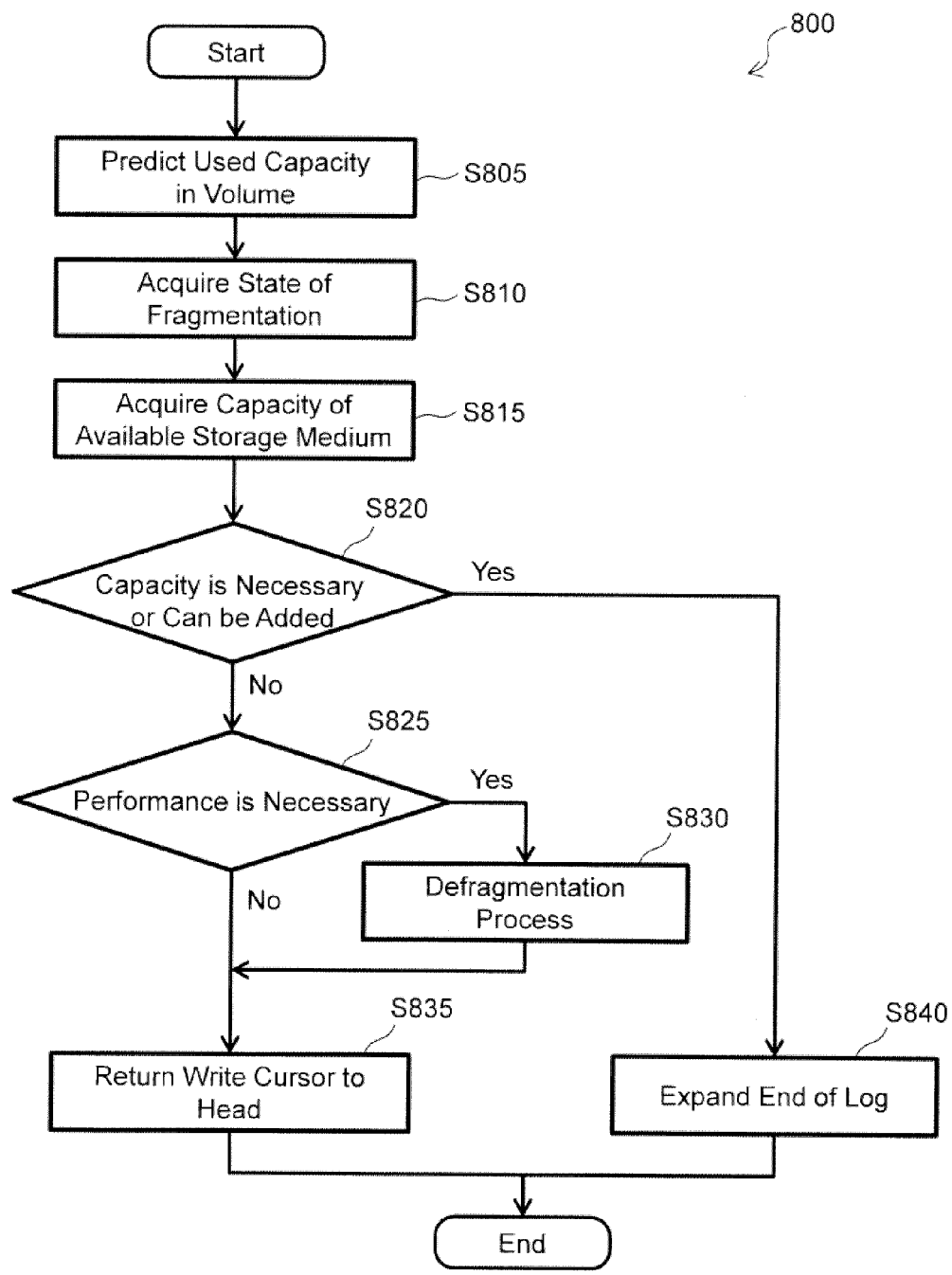
FIG. 8 is a flowchart illustrating a process of determining whether to expand an area in accordance with the first embodiment of the present invention.

FIG. 8 is a flowchart illustrating a process 800 of determining whether to expand an allocated area in accordance with an embodiment of the present invention. The process 800 of determining whether to expand an allocated area is executed by the used volume capacity management program 222 not only at a time point when the write cursor 702 has arrived at the cursor 703 at the end of the log on the virtual volume 700 but also regularly, for example.

(i) Step 805: The used volume capacity management program 222 predicts the used capacity in the virtual volume (step 805). In step 805, the total capacity of areas in the virtual volume that are used by the file system is determined. It should be noted that it is possible to not only determine the total capacity while the process 800 of determining whether to expand an allocated area is executed but also predict an increase in the capacity with time. For example, in order to predict an increase in the used amount, it is possible to store in the statistical information 223 the used amount at each time point in the past, and perform prediction from the information such that although the used capacity during the execution of the flow 800 accounts for 80% corresponding to the area of from the head of the virtual volume 700 up to the cursor 703 at the end of the log, the used capacity will account for 90% one month later.

(ii) Step 810: The used volume capacity management program 222 acquires the state of fragmentation if the on-disk data structure (step 810). Acquisition of the state of fragmentation is a typical process in file systems. In the process, the number of discontinuous unused areas as well as whether the blocks that constitute each file are discontinuous on the virtual volume are determined from each logical data structure.

(iii) Step 815: The used volume capacity management program 222 acquires from the virtual volume management program 224 the capacity of an available storage medium that can be used by the LFS program 221 for the file system. The capacity of an available storage medium supposed herein is the capacity of a storage medium provided as a physical medium. The capacity of an available storage medium may be calculated from the total capacity of the storage mediums 240 of the file storage device 200, or determined from, when a plurality of virtual volumes is created from the storage mediums 240, factors such as the allocated capacity of each virtual volume, a tendency of the increase of the used capacity of the file system corresponding to each virtual volume with time, and the required performance. For example, even when an area that can be allocated remains in a storage medium, if the used capacity of another file system is rapidly increasing, and allocation of a capacity to a virtual volume corresponding to such file system becomes necessary, it may be determined that allocation of a capacity to such file system should be prioritized, and additional allocation of a capacity to the target file system is thus impossible.

(iv) Step 820: The used volume capacity management program 222, based on the information obtained to steps 805 to 815, determines whether the used area of the file system should be expanded (whether there is an insufficient unused area) or whether the used area of the file system can be expanded (whether there is a sufficient available capacity in a physical storage medium) (step 820). If it is determined that the used area of the file system should be expanded or can be expanded though it is not necessary (if the answer to step 820 is Yes), the process proceeds to step 840. Meanwhile, if it is determined that the used area of the file system need not be expanded or cannot be expanded (if the answer to step 820 is No), the process proceeds to step 825.

(v) Step 825: The used volume capacity management program 222 determines that the performance of the file system should be maintained or improved (step 825). The determination of whether the performance should be maintained or improved can be performed by, for example, determining whether a variation of the storage position of each block in the virtual volume (which is grasped from the fragmentation information) is larger than a predetermined degree of variation. If it is determined that the performance should be maintained or improved (if the answer to step 825 is Yes), the process proceeds to step 830. If it is determined that the performance need not be maintained or improved (if the answer to step 825 is No), the process proceeds to step 835.

(vi) Step 830: The used volume capacity management program 222 instructs the LFS program 221 to perform a defragmentation process (step 830). The defragmentation process is a process of moving each data structure of the on-disk data structure on the volume and changing the reference relationship correspondingly, thereby connecting a plurality of discontinuous free areas or rearranging a plurality of blocks, which constitutes a single file, in a continuous area.

(vii) Step 835: The used volume capacity management program 222 moves the write cursor 702 to the head LBA in the unused area (step 835).

(viii) Step 840: The used volume capacity management program 222 calculates the movement amount of the cursor 703 at the end of the log from the information obtained in steps 805 and 815, and moves the cursor 703 to a LBA that is behind the current LBA (step 840).

(ix) Advantageous effects of the process of determining whether to expand an allocated area: By executing the series of processes to move the end of the log or the write cursor (by updating the positional information on the end of the log or the write cursor in the super block), it becomes possible to control update to an unallocated area in the virtual volume and thus avoid early execution of the allocation of an available capacity to the unallocated area.

<Application to System with Snapshot Function>

Figure 9:
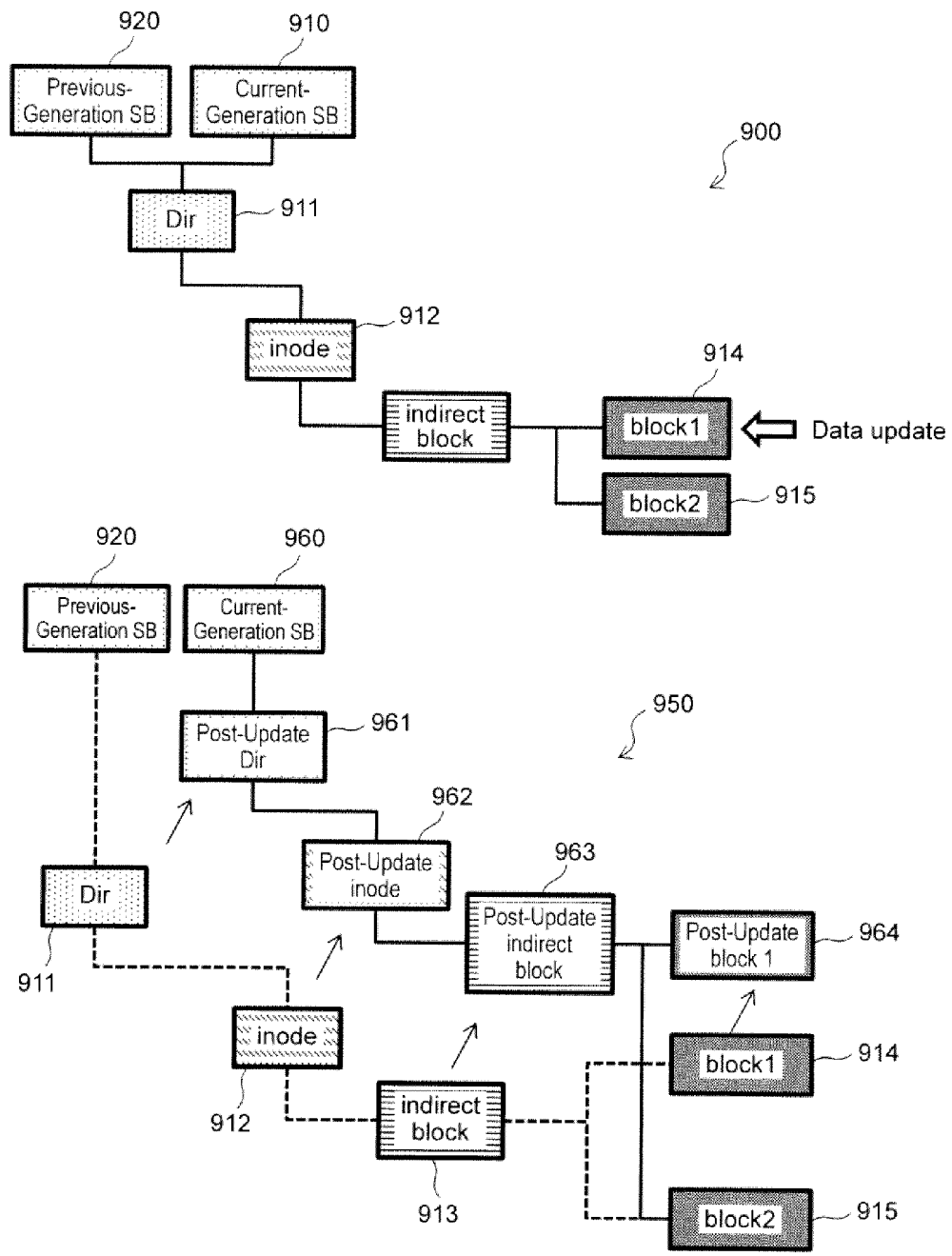
FIG. 9 is a diagram showing a data management scheme of a LFS with a snapshot function in accordance with the first embodiment of the present invention.

An example in which a capacity is predicted in step 805 when the LFS program 221 has a snapshot function will be described. FIG. 9 is a diagram showing a logical data structure 900 in the LFS program 221 with as snapshot function and a post-update logical data structure 950. The snapshot function is a function of storing the state of a file system at a given point in time in the past so as to allow the stored state of the file system to be referenced even when a file or a directory is updated later.

The logical data structure 900 is a diagram showing a data structure that is held immediately after the LFS program 221 has stored the state to implement a snapshot function. The logical data structure 900 holds a plurality of super blocks 910 and 920. The current-generation super block 910 is used to always reference the latest state of the file system, while the previous-generation super block 920 is used to reference the state of the file system at a time point in the past when the state was stored. When the state is stored at a plurality of time points, a plurality of generations of super blocks can be similarly generated. In the example below, a case where the state is stored for only one generation will be described. When a user of the file system references information on the latest file system, a file of the current generation can be referenced by referencing a variety of data structures that can be searched for through the current-generation super block 910. Meanwhile, when information on the file system at a time point when the state was stored is referenced, a file of the previous generation can be referenced by referencing a variety of data structures that can be searched for through the previous-generation super block 920.

Immediately after the state is stored, both the super blocks 910 and 920 reference the root directory 911. Thus, an inode 912, an indirect block 913, and blocks 914 and 91.5 that are referenced from the root directory 911 are shared. Therefore, an identical state of the file system is held at the latest time point and the time point when the state is stored. The post-update logical data structure 950 represents the state of the logical data structure after the block 914, which is a part of the logical data structure 900, is changed. In order to reference a post-update block 964 in which the updated block 914 is stored, a post-update indirect block 963, a post-update inode 962, and a post-update root directory 961 are stored in different areas from those of the corresponding information of the previous generation. It should be noted that the process of the current-generation super block 960 to reference the post-update root directory 961 after update is performed is identical to the process shown in FIGS. 4 and 5. However, in the LFS with a snapshot function, the state at a time point when the state is stored is held even after update is performed, by allowing the data structures 911, 912, 913, and 914 to be referenced from the previous-generation super block 920. In addition, the data structures 911, 912, 913, and 914 before update is performed are still regarded as areas used by the LFS program 221.

When the used capacity is predicted in step 805 of the process 800 of determining whether to expand an allocated area, if the LFS program 221 has a snapshot function, the used volume capacity management program 222 can predict the used capacity using a change with time of the total capacity of an area that is needed by a snapshot of the past generation and an area that is necessary to store the state of the latest file system.

(2) Second Embodiment

<Configuration of File Storage Device>

Figure 10:
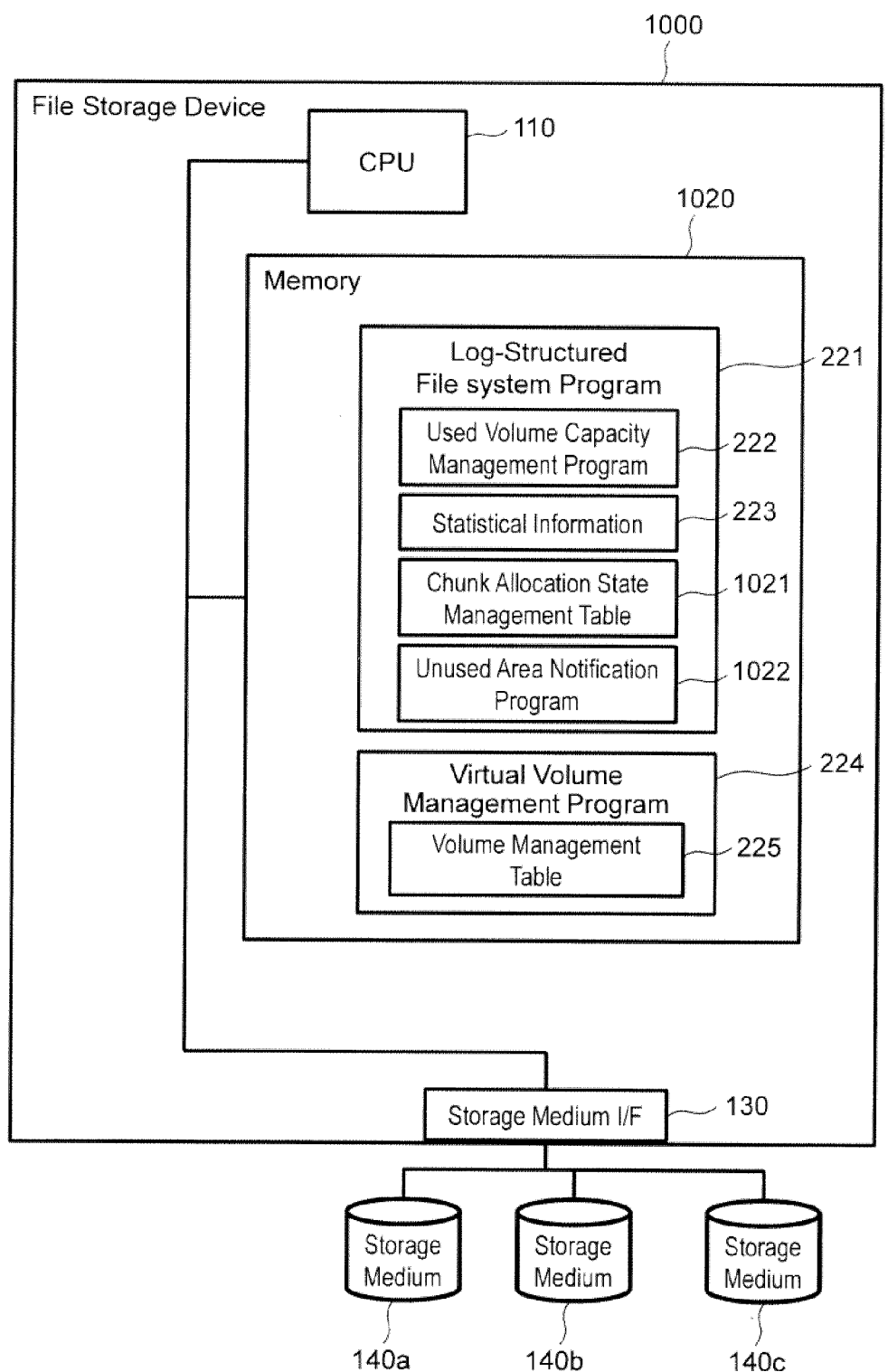
FIG. 10 is a configuration diagram of a file storage device (i.e., storage system) in accordance with the second embodiment of the present invention.

FIG. 10 is a diagram showing a schematic configuration of a file storage device 1000 in accordance with the second embodiment of the present invention. The file storage device 1000 has the same configuration as the file storage device 200 except that the content of the memory 1020 is different. The memory 1020 holds a chunk allocation state management table 1021 and an unused area notification program 1022 in addition to the information stored in the memory 220.

The chunk allocation state management table 1021 is a table holding information about whether each chunk that constitutes a virtual volume is associated with a storage medium. The chunk allocation state management table 1021 may be the volume management 125. Alternatively, information on the volume management table 225 may be summarized, and the presence or absence of allocation of each chunk may be held in a data form such as a bitmap or extent.

The unused area notification program 1022 is a program that instructs the LFS program 221 to search for a chunk that is contained in an unused area, in which data structures are not stored, in a virtual volume, and instructs the virtual volume management program 224 to cancel association between such chunk and a chunk of a storage medium.

<Process of Freeing Unused Area>

Figure 11:
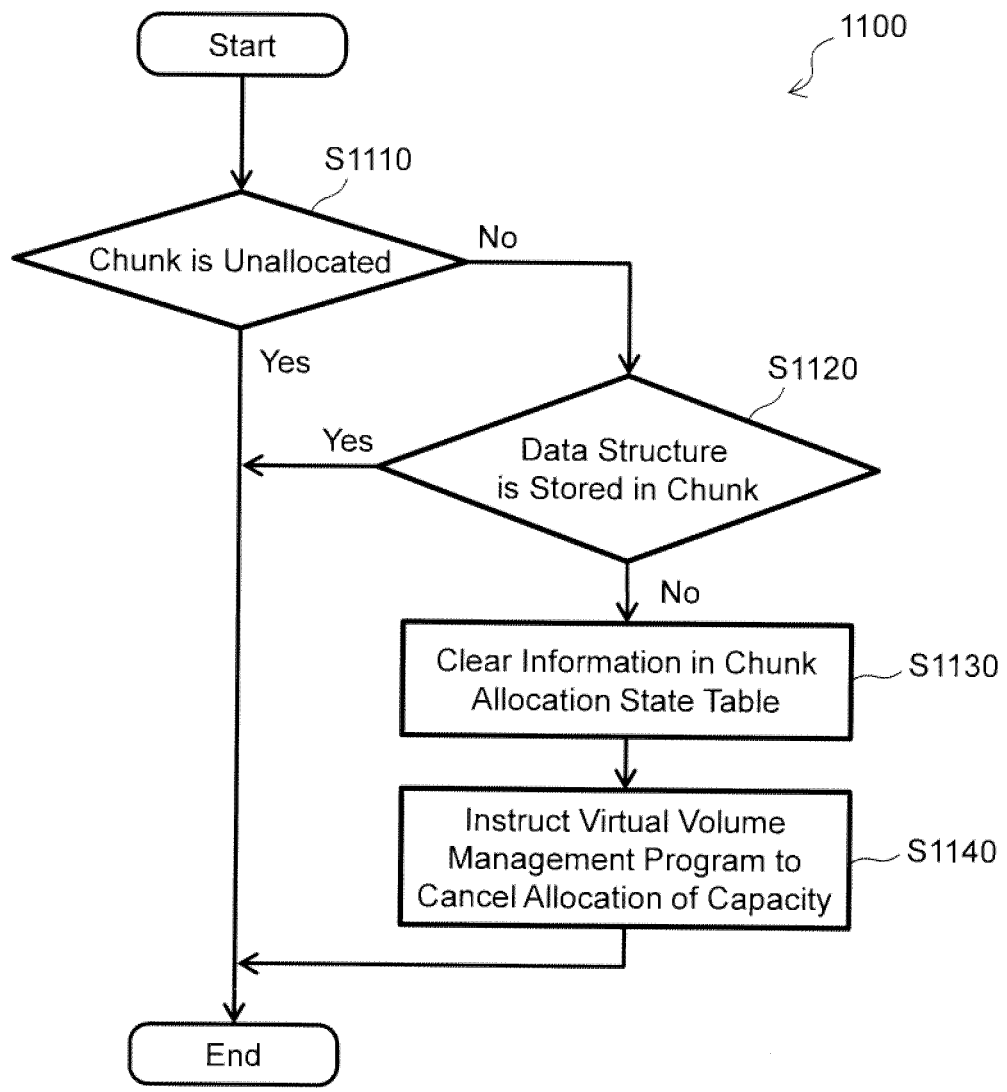
FIG. 11 is a flowchart illustrating a process of releasing a free block in accordance with the second embodiment of the present invention.

FIG. 11 is a flowchart showing a process 1100 executed by the unused area notification program 1022 to free an unused area. The process 1100 is regularly executed by the unused area notification program 1022, and is also executed when instructed by a user of the LFS or when another file system needs a larger allocation amount of available capacities than that in the current state.

(i) Step 1110: The unused area notification program 1022 references the chunk allocation state management table 1021, and determines whether each chunk that constitutes a virtual volume is unallocated (step 1110). If the chunk that is the target to be processed is unallocated (if the answer to step 1110 is Yes), the following processes are not performed. If the chunk that is the target to be processed is an allocated area (if the answer to step 1100 is No), the process proceeds to step 1120.

(ii) Step 1120: The unused area notification program 1022 checks if the allocated chunk stores as data structure that constitutes the LFS (detects a data structure) (step 1120). Detection of the data structure is executed with reference to the super block or the positional information on each block that is managed outside the data structure. If the chunk that is the target to be processed stores a data structure (if the answer to step 1120 is Yes), the process terminates. If the chunk that is the target to be processed does not store a data structure (if the answer to step 1120 is No), the process proceeds to step 1130.

(iii) Step 1130: If the chunk that is the target to be processed does not store a data structure (if the answer to step 1120 is No), such chunk can be regarded as an area not used by the LFS. Thus, the unused area notification program 1022 changes information corresponding to such chunk in the chunk allocation state management table 1021 to "unallocated" (step 1130). It should be noted that an area that is changed to an unallocated state is an unused area at a position behind the write cursor.

(iv) Step 1140: Then, the unused area notification program 1022 instructs the virtual volume management program 224 to cancel the allocation of the available capacity by cancelling the association between the chunk and the storage medium (step 1140).

(v) Advantageous effects of the process of freeing an unused area: The process 1100 can change a chunk, which corresponds to an area not used by the LFS among the chunks to which capacities have been allocated, to a capacity unallocated state.

<Process of Determining Whether to Move Write Cursor>

A chunk that has been changed to a capacity unallocated state by the process 1100 of freeing an unused area has a possibility that a post-update data structure may be written thereto again in a writing process of the LFS, and an available capacity may thus be allocated thereto. In such a case, the advantageous effect of cancelling the allocation of an available capacity is cancelled out early. Therefore, it is necessary to avoid data from being written again early to the chunk for which the allocation of an available capacity has been cancelled.

Figure 12:
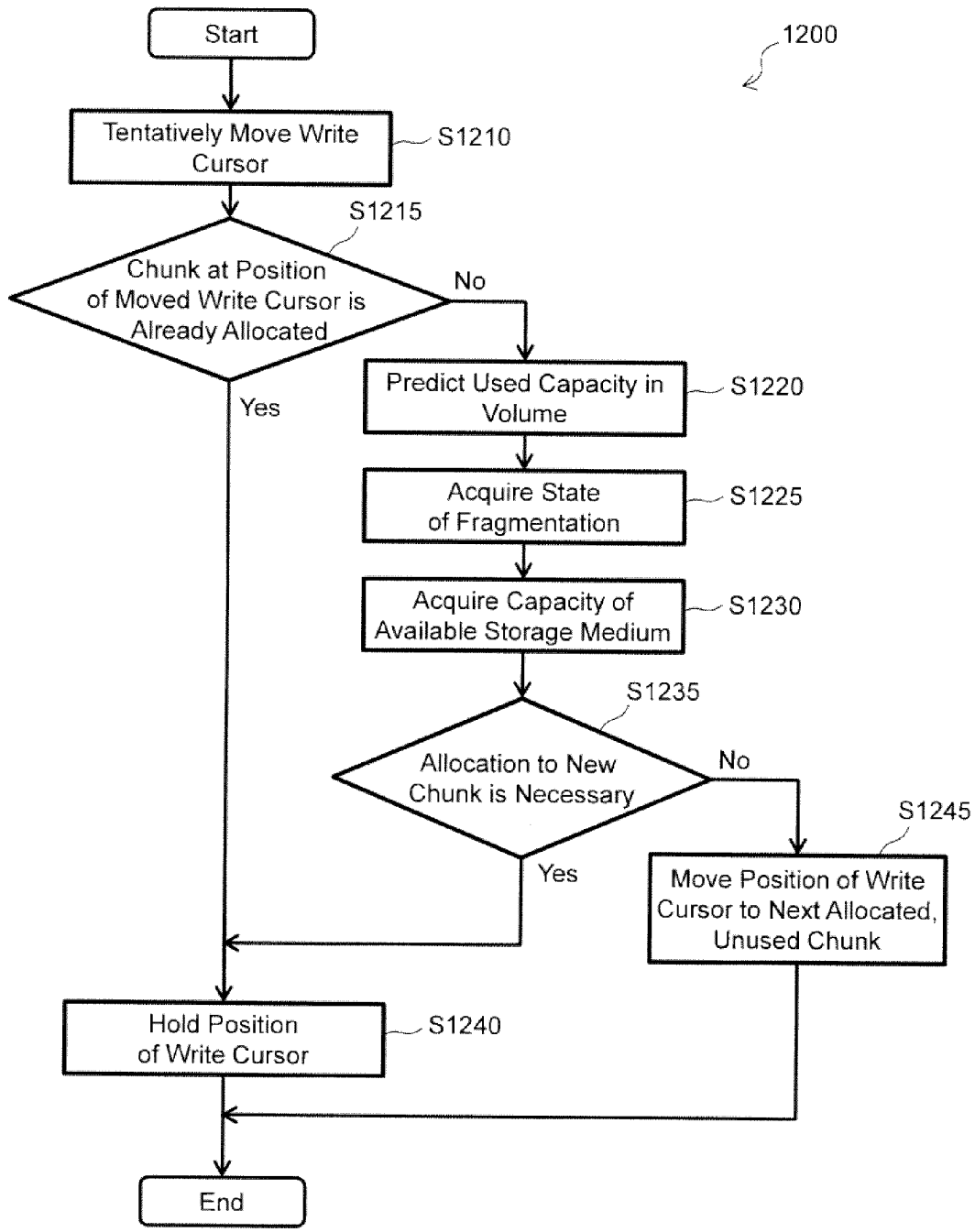
FIG. 12 is a flowchart illustrating a process of moving a write cursor in accordance with the second embodiment of the present invention.

FIG. 12 is a flowchart showing a process 1200 of determining whether to move the write cursor. When the process of determining whether to move the write cursor is executed, an unused area at a position preceding the write cursor Will be preferentially used for writing data upon movement of the write cursor after date update is performed by the LFS program 221. Thus, it is possible to avoid data from being written again early to the chunk for which the allocation of the available capacity has been cancelled.

(i) Step 1210: The LFS program 221 performs tentative movement of the write cursor (step 1210). In the tentative movement, the write cursor is moved such that points an LBA in an unused area at a position immediately behind an LBA in which a data structure was last written.

(ii) Step 1215: The LFS program 221 references the chunk allocation state management table 1021, and determines whether a chunk indicated by the tentatively moved write cursor is already allocated (step 1215). If the position of the tentatively moved write cursor indicates an allocated chunk (if the answer to step 1215 is Yes), the process proceeds to step 1240. If the chunk at the position of the tentatively moved write cursor is unallocated (if the answer to step 1215 is No), the process proceeds to step 1220.

(iii) Step 1220: The LFS program 221 predicts the capacity of the used area in the virtual volume (step 1220). The process is similar to that in step 805 in FIG. 8.

(iv) Step 1225: The LFS program 221 checks the state of fragmentation (step 1225). The process is similar to that in step 810 in FIG. 8.

(v) Step 1230: The LFS program 221 acquires information on the capacity of the available storage medium (step 1230). The process is similar to that in step 815 in FIG. 8.

(vi) Step 1235: The LFS program 221 determines if allocation of an available capacity to a new chunk is necessary based on the results of steps 1220, 1225, and 1230 (step 1235). If allocation of an available capacity to a new chunk is necessary (if the result of step 1235 is Yes), the process proceeds to step 1240. If allocation of an available capacity to a new chunk is not necessary (if the answer to step 1235 is No), the process proceeds to step 1245.

(vii) Step 1240: The LFS program 221 holds the position of the write cursor as it is and terminates the process (step 1240). It should be noted that the position of the write cursor is also held when allocation of an available capacity to a new chunk is necessary (in the case of step 1235→1240). In such to case, the write cursor points a chunk in an unallocated state. However, the next time the data is updated, the data is written at the position of the write cursor, and the virtual volume management program 224 allocates an available capacity.

(viii) Step 1245: The LFS program 221 again moves the write cursor, which has been tentatively moved, so that the cursor points an allocated, unused chunk among the LBAs that are behind the current position (step 1245).

(ix) Advantageous effects of determining whether to move the write cursor: The process 1200 allows, when allocation of a new available capacity is not necessary, the write cursor to move so that it always points an allocated chunk. Thus, it is possible to prevent data from being written again early to a chunk for which allocation of an available capacity has been cancelled, and thus prevent allocation of an available capacity again.

(3) Third Embodiment

The third embodiment relates to a file storage device with a virtual volume that is constructed from storage mediums with different performance characteristics on the LFS. Accordingly, a virtual volume having different performance for each chunk can be created.

<Exemplary Configuration of Virtual Volume>

Figure 13:
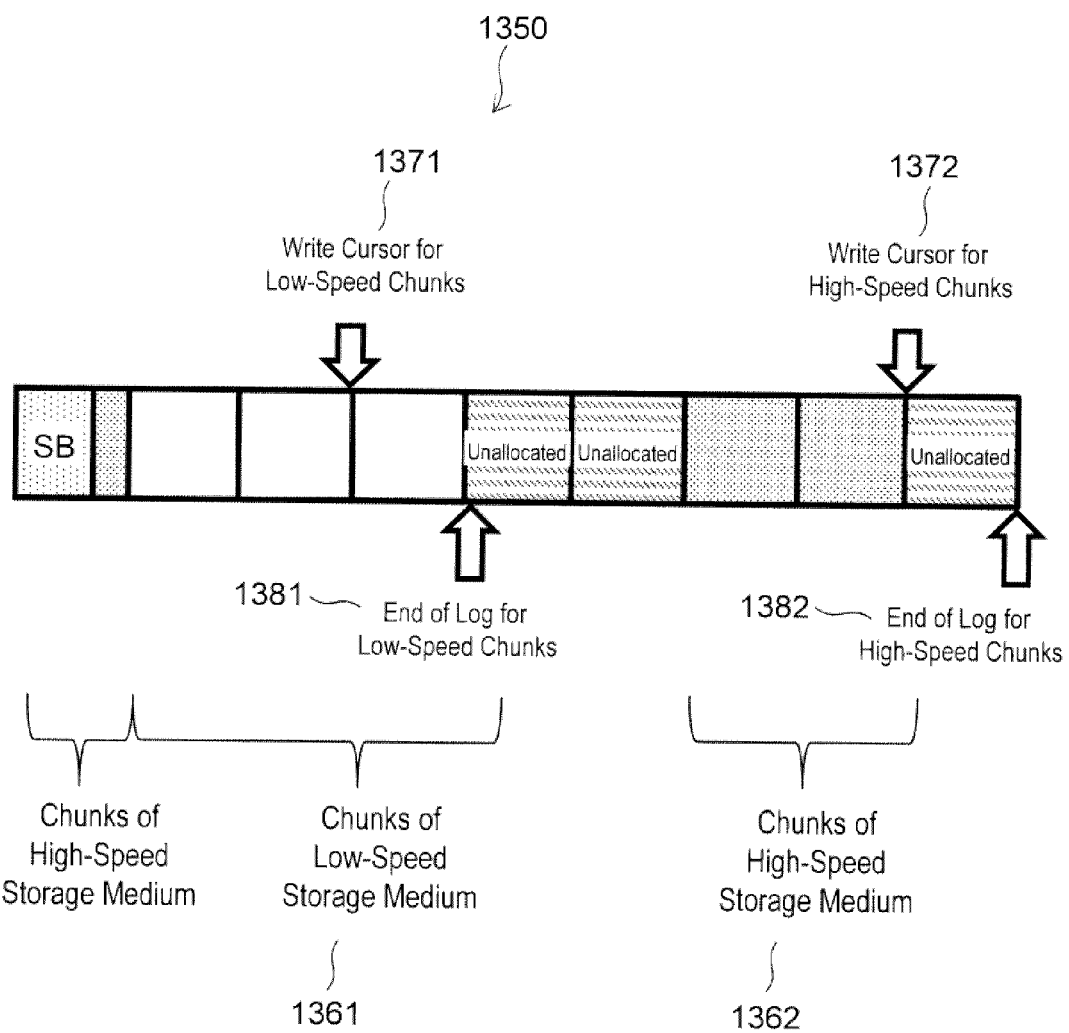
FIG. 13 is a diagram showing the correspondence between a chunk allocation state management table and a virtual volume in accordance with the third embodiment of the present invention.

FIG. 13 is a diagram showing a virtual volume 1350 constructed from a plurality of storage mediums with different performance characteristics, and a corresponding chunk state allocation table 1300.

The chunk state allocation table 1300 is a table that stores a series of numerical values indicating the allocated states of chunks of the virtual volume 1350 and the performance characteristics. For example, a chunk in which "zero" is stored in the chunk state allocation table 1300 indicates that a physical medium is not allocated. A chunk in which "1" is stored indicates that it corresponds to a group of chunks 1361 of a low-speed storage medium. A chunk in which "2" is stored indicates that it corresponds to a group of chunks 1362 of a high-speed storage medium.

As described above, the LFS program 221 manages a plurality of write cursors and cursors at the end of the log for the respective chunk groups of storage mediums with different performance characteristics. For example, the LFS program 221 manages a write cursor 1371 for low-speed chunks and a cursor 1381 at the end of the log for low-speed chunks for the chunks 1361 of the low-speed storage medium, and manages a write cursor 1372 for high-speed chunks and a cursor 1382 at the end of the logic for the chunks 1362 of the high-speed storage medium.

As described above, in the third embodiment, a single virtual volume has a mixture of chunks with high-speed performance and chunks with low-speed performance. In addition, as the two write cursors are provided, the super block holds positional information on the two cursors.

<Process of Writing and Moving Write Cursor>

Figure 14:
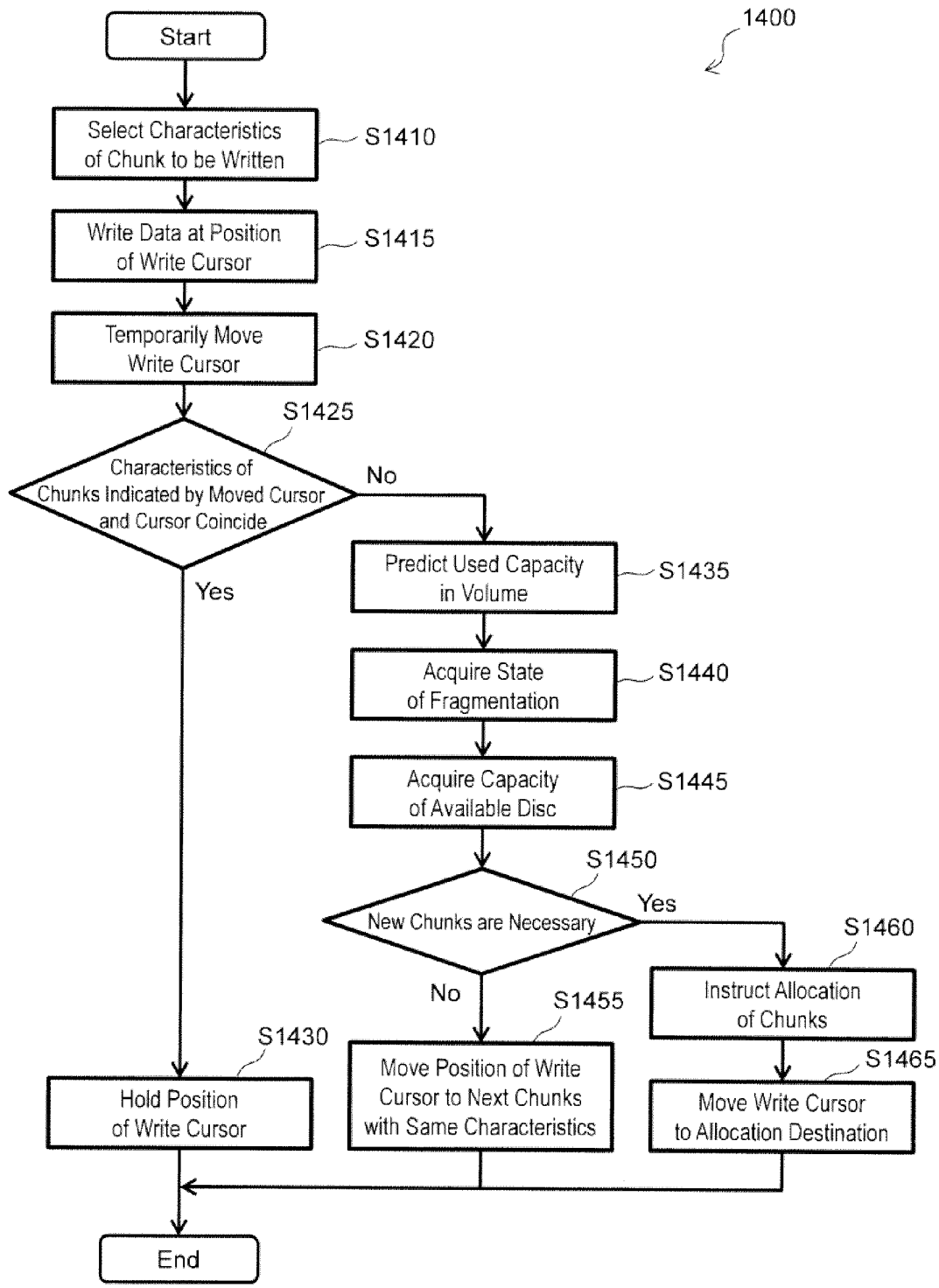
FIG. 14 is a flowchart illustrating a process of updating data and moving a write cursor in accordance with the third embodiment of the present invention.

FIG. 14 is a flowchart showing a process 1400 of the LFS program 221 to write a logical data structure to the virtual volume 1350 and move the write cursor.

(i) Step 1410: The LFS program 221 selects the performance characteristics of a chunk to which data is to be written based on the characteristics of the data to be written (step 1410). As examples of the selection criterion herein, access frequency, required performance, relevance to the data written last time, and the like of the data to be written are considered. For example, for the write destination of the data structure of a file that is accessed more frequently than a predetermined number, the chunks 1362 of the high-speed storage medium may be selected. In addition, for the directory entry and the inode that are frequently accessed in the file system, the chunks 1362 of the high-speed storage medium may be selected, while for the indirect block and the blocks that are accessed less frequently, the chunks 1361 of the low-speed storage medium may be selected, for example.

(ii) Step 1415: The LFS program 221 writes update data at the position of a write cursor corresponding to the selected chunks (step 1415).

(iii) Step 1420: The LFS program 221, upon terminating writing of the update data, tentatively moves the write cursor corresponding to the selected chunks (step 1420). Such a tentative movement process is similar to that in step 1210 in FIG. 12.

(iv) Step 1425: The LFS program 221 determines if the performance characteristics of the chunks indicated by the tentatively moved write cursor coincide with the characteristics of the write cursor (step 1425). If the characteristics coincide (if the answer to step 1425 is Yes), the process proceeds to step 1430. If the characteristics do not coincide, that is, if the chunks indicated by the tentatively moved write cursor are not allocated or have different performance characteristics (if the answer to step 1425 is No), the process proceeds to step 1435.

(v) Step 1430: The LFS program 221 holds the position of the tentatively moved write cursor, and terminates the process 1400 (1430).

(vi) Step 1435: The LFS program 221 predicts a used area in the virtual volume (step 1435). The process is similar to those in step 805 in FIG. 8 and step 1220 in FIG. 12 except that the process is executed for each storage medium with different performance.

(vii) Step 1445: The LFS program 221 checks the state of fragmentation (step 1440). The process is similar to those in step 810 in FIG. 8 and step 1225 in FIG. 12 except that the process is executed for each storage medium with different performance.

(viii) Step 1445: The LFS program 221 acquires information on the capacity of the available storage medium (step 1445). The process is similar to those in step 815 in FIG. 8 and step 1230 in FIG. 12 except that the process is executed for each storage medium with different performance.

(ix) Step 1450: The LFS program 221 determines if a new chunk with the selected performance characteristics is necessary based on the results of steps 1435 to 1445 (step 1450). If a new chunk is determined to be necessary (if the answer to step 1450 is Yes), the process proceeds to step 1460. If as new chunk is not determined to be necessary (if the answer to step 1450 is No), the process proceeds to step 1455. Such determination can also be conducted using the required performance of another file system or capacity allocation information on the virtual volume. For example, when another file system is required to have high performance, it is possible to determine that a high-performance storage medium should not be allocated to the target file system in order to allocate the high-performance storage medium to the other file system.

(x) Step 1455: The LFS program 221 references the chunk state allocation table 1021 to search for an unused area in other chunks with the same characteristics, and moves the write cursor to that position (step 1455).

(xi) Step 1460: The LFS program 221 instructs the virtual volume management program 224 to newly allocate chunks with the selected performance characteristics to an unallocated area in the virtual volume 1350 (step 1460).

(xii) Step 1465: The LFS program 221 moves the write cursor to the newly allocated chunks (step 1465).

(xiii) Advantageous effects of the process of writing and moving the write cursor: Through the process 1400, the LFS program 221 can write data to chunks with performance characteristics in accordance with the characteristics of a data structure.

There may be cases where the LFS program 221 instructs the virtual volume management program 224 to change a corresponding storage medium for the already allocated chunks. For example, there may be cases where, when a file system needs a large number of chunks of a high-speed storage medium to satisfy the required performance, some of the chunks 1362 associated with the high-speed storage medium are recovered from chunks in a virtual volume in which another file system is stored. In such a case, the LFS program 221 selects, from among data structures that are stored in the group of chunks 1362 of the high-speed storage medium, selects chunks with relatively low required performance and access frequency, and instructs the virtual volume management program 224 to associate such chunks with chunks of a low-speed storage medium. Through the series of operations, it is possible to change the association between the chunks so as to satisfy the performance required of each of the plurality of file systems.

(4) Other Embodiments

The present invention can also be realized by a program code of software that implements the functions of the embodiments. In such a case, a storage medium having recorded thereon the program code is provided to a system or an apparatus, and a computer (or a CPU or a MPU) the system or the apparatus reads the program code stored in the storage medium. In this case, the program code itself read from the storage medium implements the functions of the aforementioned embodiments, and the program code itself and the storage medium having recorded thereon the program code constitute the present invention. As the storage medium for supplying such a program code, for example, a flexible disk, CD-ROM, DVD-ROM, a bard disk, an optical disc, a magneto-optical disc, CD-R, a magnetic tape, nonvolatile memory card, ROM, or the like is used.

Further, based on an instruction of the program code, an OS (operating system) running on the computer or the like may perform some or all of actual processes, and the functions of the aforementioned embodiments may be implemented by those processes. Furthermore, after the program code read from the storage medium is written to the memory in the computer, the CPU or the like of the computer may, based on the instruction of the program code, perform some or all of the actual processes, and the functions of the aforementioned embodiments may be implemented by those processes.

Moreover, the program code of the software that implements the functions of the embodiments may be distributed via a network, and thereby stored in storage means such as the hard disk or the memory in the system or the apparatus, or the storage medium such as CD-RW or CD-R, and at the point of use, the computer (or the CPU or the MPU) in the system or the apparatus may read the program code stored in the storage medium or the storage medium and execute the program code.

Finally, it should be understood that the processes and technology described herein can be essentially implemented by not a specific device but any suitable combination of components. Further, a variety of types of general-purpose devices can be used in accordance with the teaching described herein. In order to execute the steps of the method described herein, constructing a dedicated device may be found to be advantageous. Further, at variety of inventions can be formed by appropriately combining a plurality of components disclosed in the embodiments. For example, some components may be removed from the whole components shown in the embodiments. Further, components in different embodiments may be combined as appropriate. Although the present invention has been described with reference to specific examples, they are not for limiting purposes but for illustrative purposes. One of ordinary skill in the art would appreciate that there is a number of combinations of hardware, software, and firmware that are suitable for implementing the present invention. For example, software description can be implemented by a wide range of programs or scripting languages, such as an assembler, C/C++, perl, Shell, PHP, and Java (registered trademark).

Further, in the aforementioned embodiments, the control lines and information lines represent those that are considered to be necessary for the description, and do not necessarily represent all control lines and information lines that are necessary for a product. All structures may be considered to be mutually connected.

In addition, a variety of configurations and/or components described in the embodiments may be used either alone or in an combination in a computerized storage system with a data management function.

REFERENCE SIGNS LIST

100 Configuration diagram of data management
110 LFS (Log-Structured File system)
120 Logical data structure
150 Virtual volume management unit
160 Virtual volume
170 On-disk data
171 Cursor at end of log
172 Write cursor
180 Group of Storage mediums
190 Storage medium

The invention claimed is:

1. A storage system comprising:
a file system configured to provide a virtual volume constructed from at least one storage medium; and
a processor configured to execute a process of continuously writing update data to an unused area in the virtual volume at a position behind a write cursor, and changing an area at a position preceding the write cursor, in which pre-update data has been stored, into an unused area, wherein
the processor is configured to control a size of a capacity allocated to the virtual volume from the storage medium based on a capacity that is necessary to write the update data, a capacity the unused area at the position preceding the write cursor, and a capacity of the unused area at the position behind the write cursor.

2. The storage system according to claim 1, wherein the processor is further configured to predict a future use amount of the virtual volume based on a history of a data use amount in the virtual volume, and control allocation of a capacity to the virtual volume in accordance with a result of the prediction.

3. the storage system according to claim 1, wherein the processor is configured to hold a data and a snapshot data on the file data in the virtual volume, and further predict a future use amount of the virtual volume based on a history of a use amount of the data and the snapshot data, and control allocation of a capacity to the virtual volume in accordance with a result of the prediction.

4. The storage system according to claim 1, wherein the processor is configured to, upon writing the update data to the unused area at the position preceding the write cursor without allocating a capacity to the virtual volume, execute a defragmentation process on the update data.

5. The storage system according to claim 1, further comprising a plurality of file systems, wherein the processor is configured to acquire information on a change in a capacity of the plurality of file systems, and control a size of a capacity allocated to the virtual volume by taking into consideration the information on the change in the capacity.

6. The storage system according to claim 1, further comprising a plurality of file systems, wherein the processor is configured to acquire information on a required performance of the plurality of file systems, and control a size of a capacity allocated to the virtual volume by taking into consideration the information on the required performance.

7. The storage system according to claim 6, wherein the processor is configured to, based on the information on the required performance of the plurality of file systems, execute a defragmentation process on a file system corresponding to a first required performance, and control a size of a capacity allocated to the virtual volume such that a capacity of a file system corresponding to a required performance that is higher than the first required performance is increased.

8. The storage system according to claim 1, wherein
the file system includes a plurality of virtual volumes, and
the processor is configured to, based on information on a required capacity of the plurality of virtual volumes, execute a defragmentation process on a virtual volume corresponding to a first required capacity, and control a size of a capacity allocated to the virtual volume such that a capacity of a virtual volume corresponding to a required capacity that is higher than the first required capacity is increased.

9. The storage system according to claim 1, wherein the processor is further configured to predict a future use amount of the virtual volume based on a history of a use amount of data in the virtual volume, and change a capacity allocated area in the virtual volume into an unallocated area in accordance with a result of the prediction.

10. The storage system according to claim 1, further comprising a plurality of file systems, wherein the processor is configured to acquire information on a change in a capacity of the file systems, and change a capacity allocated area in the virtual volume into an unallocated area in accordance with the information on the change in the capacity.

11. The storage system according to claim 1, wherein the processor is configured to, upon receiving a write request after changing an unused area in the virtual volume at the position behind the write cursor into a capacity unallocated area, write data by preferentially using an unused area other than the capacity unallocated area.

12. The storage system according to claim 1, wherein
the virtual volume is constructed from a plurality of storage mediums with a different performance, and
the processor is configured to independently control a size of a capacity allocated to the virtual volume from a storage medium with a first performance, and a size of a capacity allocated to the virtual volume from a storage medium with a second performance that is higher than that of the storage medium with the first performance.

13. The storage system according to claim 12, wherein in the virtual volume, data that is accessed more frequently than a predetermined number is stored in an area allocated from the storage medium with the second performance, and data that is accessed less frequently than the predetermined number is stored in an area allocated from the storage medium with the first performance.

14. The storage system according to claim 12, wherein the processor is configured to, when writing data to the virtual volume, determine to write the data to an area allocated from the storage medium with the first or second performance based on relevance of the data to data that was last written.

15. The storage system according to claim 12, further comprising a plurality of file systems, wherein the processor is configured to control a site of a capacity allocated to the virtual volume or change a storage medium that constitutes the virtual volume in accordance with a performance and a capacity of the plurality of file systems.

* * * * *